United States Patent
Doherty et al.

(10) Patent No.: US 8,670,365 B2
(45) Date of Patent: Mar. 11, 2014

(54) TELEMATICS DEVICE REACTIVATION VIA BROADCAST SMS ALERT

(75) Inventors: James Doherty, Wyandotte, MI (US); Michael J. Blanck, Clarkston, MI (US)

(73) Assignee: General Motors LLC, Detroit, MI (US)

( * ) Notice: Subject to any disclaimer, the term of this patent is extended or adjusted under 35 U.S.C. 154(b) by 428 days.

(21) Appl. No.: 12/901,795

(22) Filed: Oct. 11, 2010

(65) Prior Publication Data

US 2012/0087293 A1    Apr. 12, 2012

(51) Int. Cl.
  *H04H 20/71* (2008.01)
  *H04M 1/00* (2006.01)
  *H04M 11/00* (2006.01)
  *H04W 4/00* (2009.01)

(52) U.S. Cl.
  USPC ............ 370/312; 455/551; 455/406; 455/466

(58) Field of Classification Search
  USPC .......................................................... 370/312
  See application file for complete search history.

(56) References Cited

U.S. PATENT DOCUMENTS

| | | | |
|---|---|---|---|
| 7,873,345 B1* | 1/2011 | Dunne et al. | 455/404.1 |
| 7,894,795 B1* | 2/2011 | Dunne et al. | 455/406 |
| 2003/0195013 A1* | 10/2003 | Zicker et al. | 455/551 |
| 2006/0292980 A1* | 12/2006 | Marcos Alba | 455/3.06 |

* cited by examiner

*Primary Examiner* — Noel Beharry
(74) *Attorney, Agent, or Firm* — Leydig, Voit & Mayer, Ltd.

(57) ABSTRACT

The disclosed invention provides a system and apparatus for deactivating unused telematics units in a cost effective manner, while allowing later contact with the unit by the service provider. The service provider deactivates a device by replacing a valid MIN with an invalid default MIN, deactivating the normal CDMA registration process, and implementing a reduced frequency registration regimen. A regionally broadcast SMS message is subsequently used to reach the deactivated module. The SMS message is configured in such a way as to cause the targeted device to place a cellular call using a non-validating wireless number to a call center of the service provider. Once the telematics provider has a dedicated link call with the module, it executes a desired action, e.g., providing a newly provisioned MIN, shutting down the device entirely, collecting stored data from the device, etc.

20 Claims, 5 Drawing Sheets

TELEMATICS DEVICE REACTIVATION VIA BROADCAST SMS ALERT

BACKGROUND OF THE INVENTION

Vehicle telematics systems are increasingly popular, and new telematics devices are put into service on an ongoing basis as new customer devices are activated. However, devices are also sometimes removed from service for various reasons. For example, a customer may no longer need telematics service, or may cease use of a certain device to begin use of another device.

Whatever the cause, the deactivation of telematics units can impede future actions with respect to such a device, e.g., reactivation, data gathering, shut down, etc. For example, if a user has had a vehicle telematics module (hereinafter "telematics module") deactivated and then subsequently sells the vehicle, the new user may wish to reactivate the inactive module. Typically, this requires a complex sequence of steps that is a burden and cost on service providers. As another example, a service provider may wish to collect data, e.g., for statistical analysis or network problem solving, from a deactivated module, but this is typically a difficult task given to the device is deactivated. Similarly, a service provider may wish to completely shut down a device that has been deactivated but that is nonetheless causing network interference. Such a service provider may however have difficulty contacting and controlling the device due to its deactivated status.

BRIEF SUMMARY OF THE INVENTION

The invention provides a system and method for communicating with a deactivated telematics module, including constructing an SMS message for transfer to the telematics module, wherein the SMS message identifies the telematics module and instructs the telematics module to call the sender. The SMS message is broadcast via a regional broadcast including the latest registration location of the telematics module. Once the targeted module receives and processes the SMS message, a wireless call is received from the telematics module pursuant to the broadcast SMS message, so as to open a communication channel between the service provider and the telematics module.

Other objects and advantages of the invention will be appreciated by those of skill in the art upon reading this description in conjunction with the included figures of which:

DETAILED DESCRIPTION OF THE INVENTION

Figure 1:
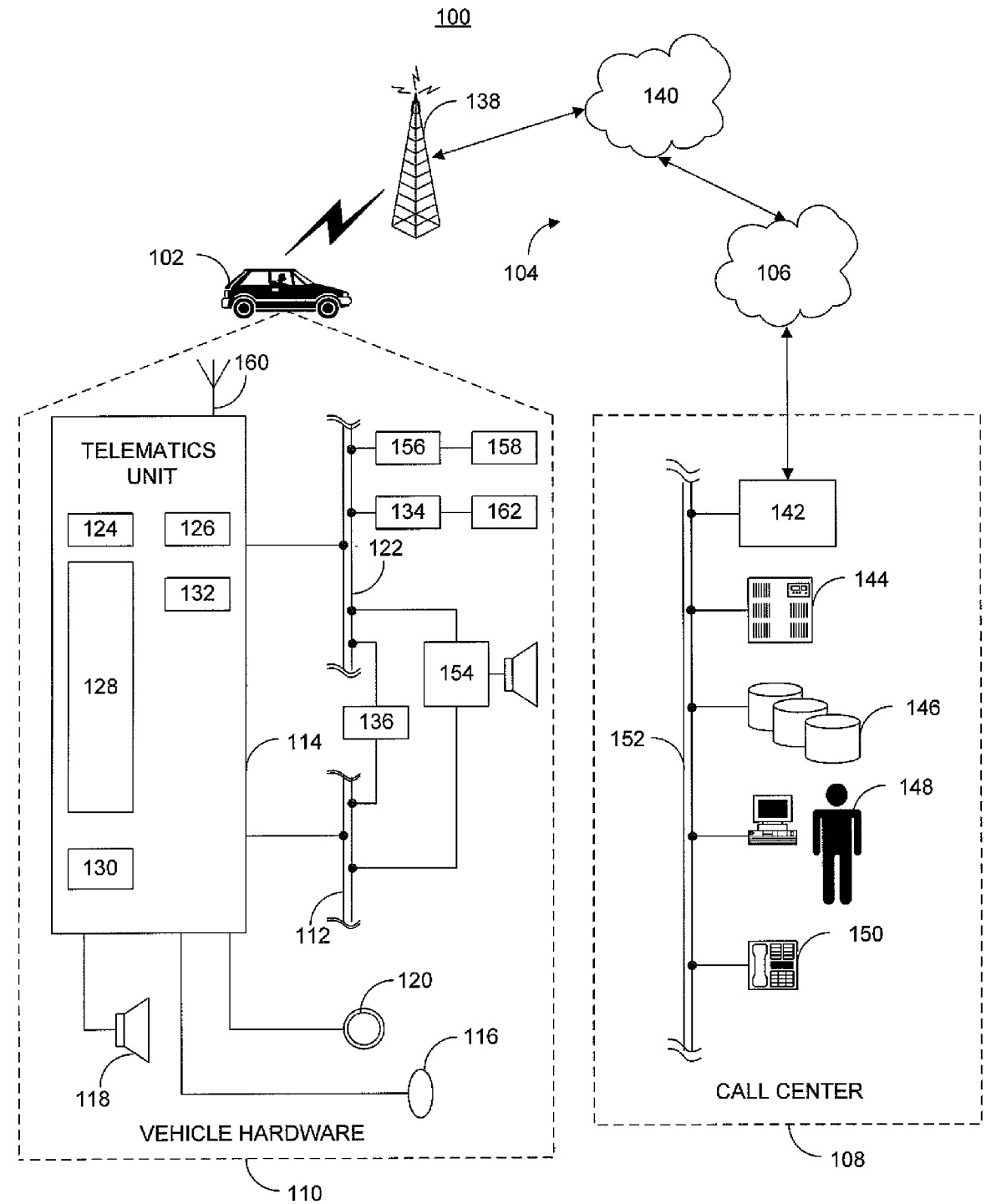
FIG. 1 is a schematic diagram of a communication system within which the described principles may be implemented.

Before discussing the details of the invention and the environment wherein the invention may be used, a brief overview is given to guide the reader. In general terms, not intended to limit the claims, the invention is directed to a system to effectively deactivate unused telematics units in a cost effective manner, while allowing later contact with the unit by the service provider, e.g., for reactivation. The described system may reduce both costs and network usage on de-activation.

During deactivation, it is possible for a service provider to deactivate a device by replacing a valid MIN (Mobile Identification Number) with an invalid default MIN and deactivating the normal CDMA registration process. Thus, even though the NAD (Network Access Device) constantly monitors the CDMA paging channel, it no longer registers on a network. Because of these two processes, it is often impossible for the service provider to establish a connection with a deactivated device, making remote reactivation difficult or impossible without user intervention.

Being able to reconnect with deactivated devices without requiring such intervention would allow the service provider to quickly and easily reactivate a telematics module as it comes into a new customer's possession. It would also allow the service provider to shut down troublesome devices that are causing network issues after being deactivated.

In an implementation of the described principles, a regionally broadcast SMS message is used to reach a deactivated module, e.g., one with no valid MIN/MEID combination, or an incorrectly provisioned telematics module, e.g., one with a mismatched MIN/MEID combination. In a further implementation, the SMS message is configured to cause the device to place a cellular call using a non-validating wireless number to a call center of the service provider.

It will be appreciated that a nonactive telematics module, e.g., one having a generic non-active MIN and no longer registering normally with the wireless network, is normally unreachable for further action or reactivation by the service provider. However, in an implementation of the described principles, the aforementioned broadcast SMS message is directed to all telematics modules provisioned with the generic deactivation MIN. The SMS message also contains a code instructing the telematics device to connect to the service provider. Further, instead of registering as normally required by the wireless network, the deactivated telematics device only registers at a prescribed time to reduce its use of network resources. The telematics service provider further has a direct link to either an SMS aggregator or a wireless provider's SMPP to facilitate sending of the SMS broadcast. An HLR/VLR reports the regional location of the telematics device during its controlled registration process so that, using the SMS link, the telematics service provider can regionally broadcast an SMS message to all deactivated telematics devices within a certain area only.

The SMS may be encrypted and contains instructions for a specific deactivated telematics device. All telematics devices that are not the intended recipient discard the SMS message. The SMS message instructs the deactivated telematics module to place a circuit-switched cellular call to the telematics service provider using a non-validating, cleared number. Once the telematics provider has a dedicated link call with the module, it can execute a desired action, e.g., providing a newly provisioned MIN, shutting down a troublesome device, collecting stored data, etc.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of an exemplary vehicle environment within which aspects of the invention may be implemented.

With reference to FIG. 1 there is shown an example of a communication system 100 that may be used with the present system and method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method or form part of the present system as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) (180 is not shown in FIG. 1) of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include powertrain control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
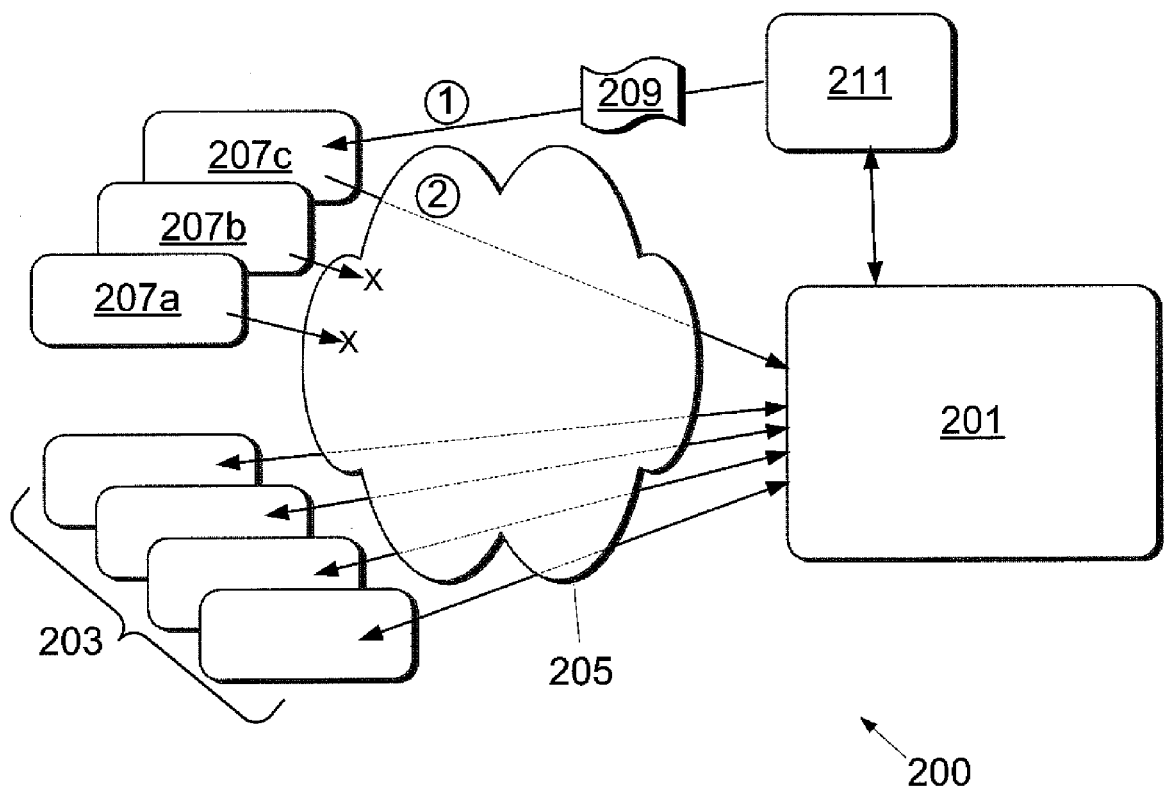
FIG. 2 is a schematic diagram of a network environment in accordance with the described principles including a service provider facility, activated telematics units, deactivated telematics units, and wireless network.

Within this context, the described system operates to enhance the service provider's ability to connect with and control deactivated devices for shutdown, reactivation, data retrieval, etc. The schematic network diagram of FIG. 2 shows a network environment 200 wherein a service provider facility 201 is in contact with activated telematics units 203 via a wireless network 205, e.g., made available by a wireless provider entity. Deactivated devices 207a and 207b are not in communication with the telematics service provider 201. However, deactivated device 207c is put into communication with the telematics service provider 201 after receipt of an SMS message 209 as described more particularly hereinafter. The deactivated device 207c may or may not then be reactivated by the telematics service provider 201.

Regarding transmission of the SMS message 209 from the telematics service provider 201 to the deactivated device 207c, the telematics service provider 201 is connected to either an SMS aggregator 211 or alternatively a wireless provider's SMPP system (not shown). SMPP, or Short Message Peer-to-Peer protocol, is a telecommunications industry protocol for exchanging SMS messages between SMS peer entities.

As noted above, instead of registering as normally required by the wireless network, the deactivated telematics devices only registers at a prescribed time to reduce the use of network resources. The HLR/VLR (Home Location Register/Visiting Location Register) will report the regional location of the telematics devices during its controlled registration process. Thus, the telematics service provider 201 remains aware of the location of devices 207a-c, even though they are deactivated.

Using the SMS link 209, the telematics service provider 201 sends a regionally broadcast SMS message to all deactivated telematics devices 207a-c, that is, all telematics devices that are in a particular geographic region and that are provisioned with the generic deactivation MIN. As noted earlier, the SMS may be encrypted and contains instructions for a specific deactivated telematics device (in this case, device 207c).

Regarding the receipt and processing of devices 207a-c, all telematics devices that are not the intended recipient (i.e., devices 207a-b in this example) discard the SMS message 209. The SMS message 209 instructs the intended recipient deactivated telematics module 207c to place a circuit-switched cellular call to the telematics service provider 201 using a non-validating, cleared number. Such a number is usable by devices that are not activated.

Once the telematics provider 201 has a dedicated link call with the module 207c via the call placed from the module 207c to the service provider 201, the service provider 201 executes a desired action. The desired action may include one or more remotely executable actions such as reactivating a device and providing a newly provisioned MIN, shutting down a troublesome device, collecting stored data, etc.

Figure 3:
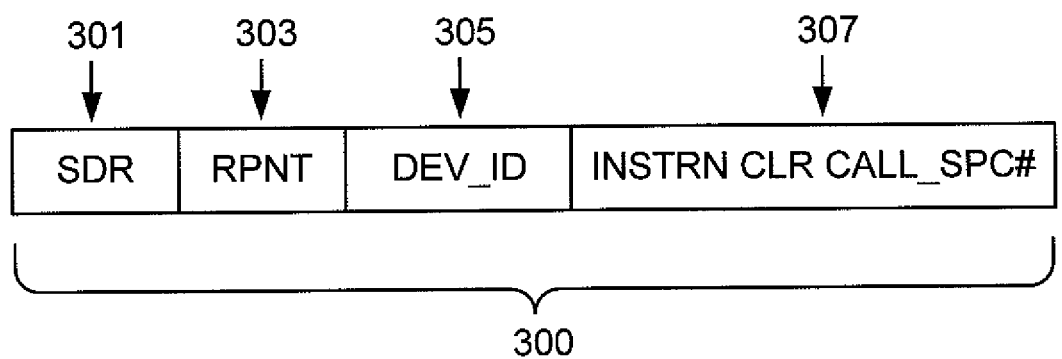
FIG. 3 is a simplified diagram of an exemplary data structure and content configuration for an SMS message in accordance with the described principles.

FIG. 3 shows an exemplary data structure 300 and content configuration for the SMS message 209 in one variation of the described principles. Those of skill in the art will be familiar with the SMS format generally, and therefore this description will forgo a detailed discussion of the standard SMS fields such as DESTINATION_TON, DESTINATION_NPI, etc., and will describe only the substantive fields relating specifically to the described system.

In the illustrated example, the SMS data structure 300 includes a sender field 301, a recipient field 303, a device identity field 305, and an instruction field 307. The sender field 301 identifies the telematics service provider, while the recipient field 303 identifies the class of deactivated devices, e.g., via the generic deactivation MIN. The device identity field 305 specifically identifies the target device (e.g., device 207c), to the exclusion of the other recipient devices, e.g., devices 207a-b. This identification may be any suitable device-specific identifier known to the telematics service provider, e.g., SIM etc.

Finally, the instruction field 307 contains an instruction for the specifically identified device in receipt of the SMS message to call the telematics service provider at a specified number. The specified number is preferably a cleared number to allow the targeted deactivated device to make the call.

Figure 4:
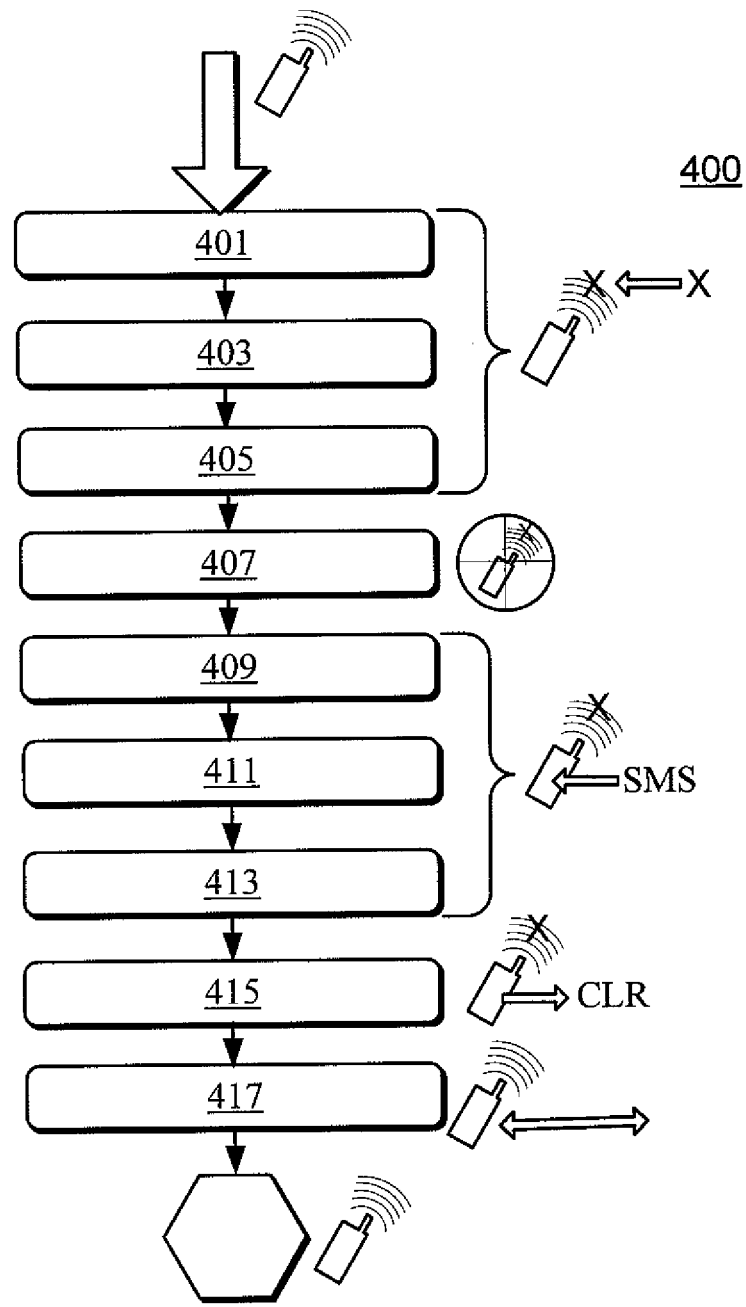
FIG. 4 is a flow chart illustrating a process of deactivating and reactivating a telematics device by a telematics service provider in accordance with the described principles.

Given the environment and configuration of the network elements and messages that facilitate implementations of the invention, the flow chart 400 of FIG. 4 illustrates a process of deactivating and then reactivating a given telematics device by a telematics service provider. It will be appreciated that the act of reactivation may instead include other actions such as shut down of the device, data gathering from the device, and so on.

The process 400 begins at stage 401, wherein the service provider receives a request to deactivate an active telematics module. This request may be the result of an internal system, or may arise externally. e.g., from a dealer or customer. The service provider having received the request to deactivate the active telematics module, the process flows to stage 403, wherein the service provider replaces the valid MIN associated with the device with an invalid default MIN. At stage 405, the service provider deactivates the normal CDMA registration process and sets the device to register infrequently to minimize network usage. For example, the device may be set to register only at a prescribed time or interval, or only when it's location changes.

Although the device is now deactivated, the service provider may still track the location of the device. In particular, at stage 407, the telematics service provider receives an HLR/VLR report of the regional location of the telematics device at the time of its controlled registration process.

The service provider receives a request to reactivate the deactivated device at stage 409. This request may, again, stem from an internal or external source. Thus at stage 411, the service provider constructs an SMS message for transfer to the deactivated device. The SMS message may be encrypted and identifies a specific deactivated telematics device. The SMS message contains instructions for the specified telematics device to connect to the service provider. In particular, the SMS message instructs the deactivated telematics module to place a circuit-switched cellular call to the telematics service provider using a non-validating, cleared number.

At stage 413, the service provider broadcasts the SMS message in the locale where the targeted device is known to be, to all telematics modules provisioned with the generic deactivation MIN. With regard to this step, in an implementation, the service provider is associated with either an SMS aggregator or a wireless provider's SMPP. All telematics devices that are not the intended recipient discard the SMS message. However, the targeted device not only receives but also processes the message. As noted above, the SMS message instructs the deactivated telematics module to place a circuit-switched cellular call to the telematics service provider using a non-validating, cleared number.

Thus, at stage 415, the service provider receives a call from the targeted device. Once the telematics provider has a dedicated link call with the module, it executes reactivation at stage 417, e.g., providing a newly provisioned MIN, reestablishing CDMA registration, etc.

Figure 5:
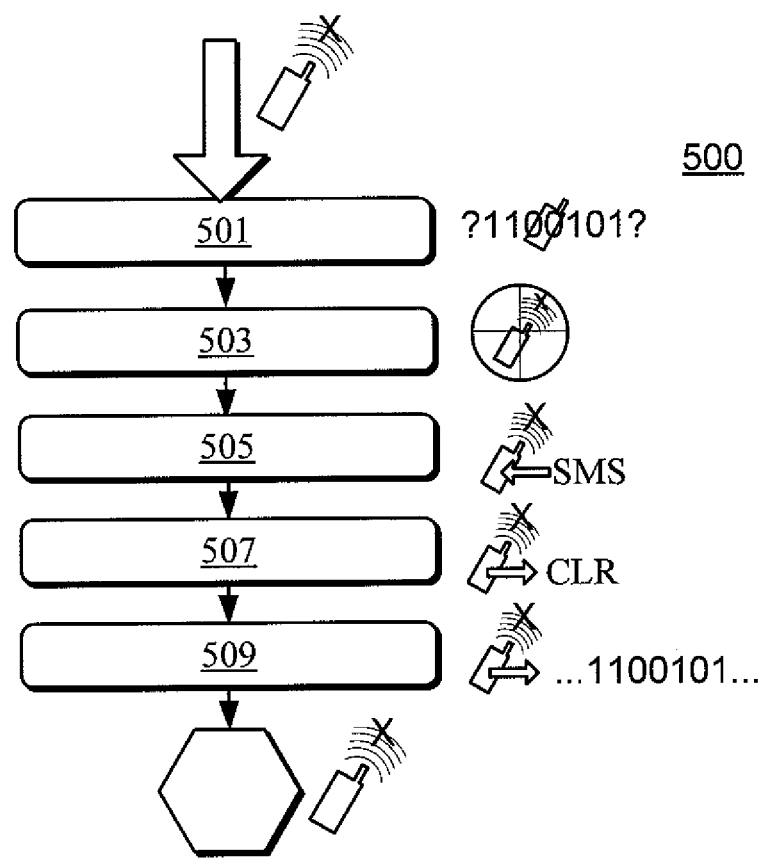
FIG. 5 is a flow chart illustrating a process of collecting stored data from a deactivated telematics module by a telematics service provider in accordance with the described principles.

As noted above, the described principles are usable to perform other actions instead, e.g., shutting down a troublesome device, collecting stored data, etc. FIG. 5 is a flow chart showing the use of the described principles to collect stored data from a deactivated device without reactivating the device. Thus, at stage 501 of the process 500 the service provider receives a request to collect data from a deactivated telematics module. As before, this request may be internal or external. The service provider having received the request, the process flows to stage 503, wherein the service provider receives an HLR/VLR report of the regional location of the telematics device at the time of its controlled registration process.

The service provider broadcasts an SMS message identifying the target device at stage 505. As in process 400, the SMS message may be encrypted and identifies a specific deactivated telematics device. The SMS message contains instructions for the specified telematics device to connect to the service provider using a non-validating, cleared number and to transmit certain data to the service provider. Alternatively, the request to transmit data may be sent from the service provider to the device after the cleared link has been opened.

Consequently, at stage 507, the targeted device receives and processes the message, and places a non-validating cleared number call to the telematics service provider. At stage 509, with the circuit-switched call open, the targeted device transmits the requested data to the telematics service provider and ends the call.

From this description, it will be appreciated that the disclosed principles provide a system and method for deactivating a telematics device in a way that allows subsequent communications with that device. It will also be appreciated, however, that the described systems, methods and implementations are merely examples of the inventive principles, and that these illustrate only preferred techniques. It is contemplated that other implementations of the invention may differ in detail from the foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method, executed by a telematics service provider (TSP), for communicating with a previously deactivated telematics module, the telematics module having wireless communication hardware, the method comprising:

opening a connection to the telematics module via the wireless communication hardware and deactivating the telematics module by replacing a valid mobile identification number (MIN) associated with the module with an invalid default MIN, deactivating ordinary registration, and configuring the telematics module to register at a non-zero rate that is less frequent than required by ordinary registration;

receiving, at the TSP subsequent to deactivating the telematics module, a location report identifying a latest registration location of the telematics module;

constructing, after the receiving a location report, a short message service (SMS) message for transfer to the telematics module, wherein the SMS message includes: a message recipient field identifying a group of intended recipients, a device identity field identifying the deactivated telematics module, and an instruction field that instructs the telematics module to call the TSP;

multicast transmitting the SMS message from the TSP to deactivated telematics units, identified in the message recipient field, that are in a region corresponding to the latest registration location of the telematics module; and receiving, at the TSP in response to the SMS message, a wireless call from the telematics module to open a communication channel with the telematics module.

2. The method according to claim 1, wherein the SMS message is encrypted.

3. The method according to claim 1, wherein the instructions for the telematics module to call the sender include instructions to place a circuit-switched cellular call to the sender using a non-validating, cleared number.

4. The method according to claim 1, wherein multicast transmitting the SMS message from the TSP to deactivated telematics units in the region corresponding to the latest registration location of the telematics module includes multicast transmitting the SMS message to all telematics modules provisioned with the invalid default MIN in the region.

5. The method according to claim 1, wherein the SMS message is multicast transmitted via one of an SMS aggregator and a wireless provider short message peer-to-peer (SMPP) system.

6. The method according to claim 1, wherein the SMS message is configured such that all telematics devices that are not the targeted telematics module discard the SMS message.

7. The method according to claim 1, further including reactivating the telematics module, once the communication channel with the telematics module is open, by providing a newly provisioned MIN to the telematics module and reestablishing CDMA registration for the telematics module.

8. The method according to claim 1, further including shutting down the telematics module, once the communication channel with the telematics module is open.

9. The method according to claim 8, further including detecting that the telematics module is causing network interference before shutting down the telematics module.

10. The method according to claim 1, further including retrieving stored data from the telematics module, once the communication channel with the telematics module is open.

11. The method according to claim 1, wherein receiving a location report identifying a latest registration location of the telematics module comprises receiving one of a home location register (HLR) report and a visitor location register (VLR) report.

12. The method according to claim 1, wherein configuring the telematics module to register less frequently than required by ordinary CDMA registration comprises one of the group consisting of configuring the telematics module to register only at prescribed time intervals and configuring the telematics module to register only upon a change of regional location.

13. A non-transitory computer readable medium having thereon computer executable instructions for contacting a deactivated telematics module, the telematics module having wireless communication hardware, the computer executable instructions comprising:

instructions for receiving a location report identifying a location of the deactivated telematics module;

instructions for constructing a short message service (SMS) message for transfer from a telematics service provider (TSP) to the deactivated telematics module, wherein the SMS message includes: a message recipient field identifying a group of intended recipients, a device identity field identifying the deactivated telematics module, and an instruction field that instructs the telematics module to call the TSP;

instructions for multicast transmitting the SMS message to deactivated telematics units, identified in the message recipient field, that are in the region corresponding to the latest registration location of the telematics module; and instructions for receiving, by the TSP in response to the SMS message, a wireless call from the telematics module to open a communication channel with the telematics module.

14. The non-transitory computer readable medium according to claim 13, wherein the instructions for the telematics module to call the sender include instructions to place a circuit-switched cellular call to the sender using a non-validating, cleared number.

15. The non-transitory computer readable medium according to claim 13, wherein the instructions for multicasting the SMS message to multiple deactivated telematics units in the region corresponding to the latest registration location of the telematics module include instructions for multicasting the SMS message to all telematics modules provisioned with an invalid default MIN in the region.

16. The non-transitory computer readable medium according to claim 13, further including instructions for reactivating the telematics module, once the communication channel with the telematics module is open, by providing a newly provisioned MIN to the telematics module and reestablishing CDMA registration for the telematics module.

17. A method for enabling communication between a telematics service provider (TSP) and a deactivated wireless telematics module, the method comprising:

receiving, at the deactivated telematics module from the TSP, a short message service (SMS) message sent via a multicast to deactivated telematics units, identified in a message recipient field of the SMS message, that are in a region corresponding to the latest registration location of the telematics module;

determining that the multicast SMS message is directed to the telematics module, wherein the SMS message includes: the message recipient field identifying a group of intended recipients, a device identity field identifying the deactivated telematics module, and an instruction field that includes instructions for the telematics module to call the TSP; and placing a wireless call from the telematics module to the TSP pursuant to the multicast SMS message to open a communication channel between the telematics module and the TSP.

18. The method according to claim 17, wherein placing a wireless call from the telematics module to the service provider pursuant to the multicast SMS message comprises placing a circuit-switched cellular call to the sender using a non-validating, cleared number identified in the SMS message.

19. The method according to claim 17, further including receiving instructions for reactivation of the telematics module from the service provider once the communication channel is open.

20. The method according to claim 19, wherein the instructions for reactivation of the telematics module include an assignment of a newly provisioned mobile identification number (MIN) to the telematics module and instructions for the telematics module to engage in ordinary code division multiple access (CDMA) registration.

* * * * *